United States Patent [19]
Floyd et al.

[11] Patent Number: 5,930,688
[45] Date of Patent: Jul. 27, 1999

[54] METHOD AND APPARATUS FOR INTERMODULATION NOISE SUPPRESSION IN RF POWER AMPLIFIERS

[75] Inventors: Franklin W. Floyd, Concord, Mass.; Christopher Keate, Santa Clara, Calif.

[73] Assignee: Stanford Telecommunications, Inc., Reston, Va.

[21] Appl. No.: 07/862,156

[22] Filed: Apr. 2, 1992

[51] Int. Cl.$^6$ ...................................................... H04B 1/04
[52] U.S. Cl. .......................... 455/116; 455/114; 455/127
[58] Field of Search ................................. 455/23, 24, 46, 455/47, 49.1, 50.1, 63, 67.3, 109, 114, 116, 119, 308, 127; 375/297

[56] References Cited

U.S. PATENT DOCUMENTS

| | | | |
|---|---|---|---|
| 2,051,503 | 8/1936 | Usselman | 455/114 |
| 3,084,328 | 4/1963 | Groeneveld et al. | 455/109 |
| 3,566,285 | 2/1971 | Schroeder | 455/114 |
| 4,194,154 | 3/1980 | Kahn | 455/114 |
| 4,211,894 | 7/1980 | Watanabe et al. | 370/38 X |
| 4,223,405 | 9/1980 | Hattori et al. | 455/105 |
| 4,370,622 | 1/1983 | Hornbeck et al. | 455/116 |
| 4,539,707 | 9/1985 | Jacobs et al. | 455/116 |
| 4,802,236 | 1/1989 | Walczak et al. | 455/116 |
| 5,163,181 | 11/1992 | Koontz | 455/114 |
| 5,175,875 | 12/1992 | Yokoya et al. | 455/116 |

FOREIGN PATENT DOCUMENTS

| | | | |
|---|---|---|---|
| 4087424 | 3/1992 | Japan | 455/114 |

OTHER PUBLICATIONS

Holt, Francis R.; Elimination of Out–of–Band Radiation From Transmitters; Jun. 1960; pp. 1–2.

"Digital Communications By Satellite", Info. & System Sciences Series, James J. Spilker.

*Primary Examiner*—Edward F. Urban
*Attorney, Agent, or Firm*—Jim Zegeer

[57] ABSTRACT

An apparatus and method for suppressing intermodulation noise in a radio frequency power amplifier. Intermodulation noise suppression is achieved by use of an amplitude limiter connected to the signal source and a shaping filter connected between the amplitude limiter and the power amplifier. The shaping filter may be a band-stop notch filter which attenuates intermodulation noise in a selected radio band or a bandpass filter which attenuates all out-of-band intermodulation noise. The intermodulation noise suppression of this invention causes the signal entering the power amplifier to be characterized by (1) a low peak-to-average envelope distribution and (2) low spectral content in the radio frequency bands to be protected.

6 Claims, 4 Drawing Sheets

METHOD AND APPARATUS FOR INTERMODULATION NOISE SUPPRESSION IN RF POWER AMPLIFIERS

BACKGROUND AND BRIEF DESCRIPTION OF THE INVENTION

The general problem solved by this invention is that of out-of-band intermodulation (IM) noise generated by radio transmitters due to the effects of circuit non-linearities in the power amplifier. All transmitter power amplifiers exhibit intermodulation noise to some degree. Digital Communications by Satellite, by J. J. Spilker, Prentice Hall, Inc., Englewood Cliffs, N.J., 1977, pages 220–264 provides an overview of the theoretical aspects of intermodulation noise generation in non-linear amplifiers. FIG. 1 from this reference and labelled "Prior Art", shows the general nature of the output spectrum of the theoretical, non-linear amplifier with a wideband input signal. The "ears" extending to either side of the output spectrum are the out-of-band component of intermodulation noise under discussion. This noise can interfere with users in adjacent bands of the radio spectrum. Power amplifiers (PA's) must therefore be designed to meet specifications on the amount of out-of-band intermodulation noise they can emit.

In the particular application being addressed here, the radio transmitter is in a satellite communications downlink. The transmitting band is adjacent to a band that has been set aside for radio astronomy (RA) observations. Any manmade interference in the radio astronomy band must be kept to exceedingly low levels. While in the embodiment disclosed herein, the invention minimizes power amplifier generated intermodulation noise in the radio astronomy band, the invention can be applied to minimizing the out-of-band intermodulation noise of radio transmitters in general.

The non-linear circuit effects in transmitter power amplifiers can be classified as saturation, AM-AM conversion and AM-PM conversion. FIG. 2 is from the above reference and labeled "Prior Art", and is a theoretical model of a power amplifier. It illustrates the three classes of non-linear effects. Saturation is included in FIG. 2 with the "Amplitude Non-linearity, F(z)".

The object of the present invention is to provide a method and apparatus for suppression of intermodulation noise in radio frequency power amplifiers.

The present invention addresses saturation, which is a very significant, if not the dominant, non-linear effect contributing to intermodulation noise in many transmitter circuits.

In this invention, the power amplifier input signal is assumed to be a wideband signal with, for example, a Raleigh-distributed amplitude envelope. The Raleigh distribution characterizes some important classes of waveforms such as multi-carrier frequency division multiplexed (FDM) signals and code division multiplexed (CDM) signals. A feature of a Raleigh distributed signal is that it has occasional envelope peaks that are much higher than the average amplitude. These peaks are clipped by the power amplifier saturation characteristic. This clipping is one of the major sources of intermodulation noise in the power amplifier.

The out-of-band intermodulation noise could be removed by a filter following the power amplifier, but the insertion loss of typical filters often makes this an unattractive solution because it reduces the overall efficiency of the transmitter to unacceptable low levels.

The clipping effect can also be minimized by designing the power amplifier saturation level to be much higher than the average envelope level, however this is usually an unacceptable solution because the power amplifier would then be operating at very low efficiency.

With practical power amplifiers, therefore one must do a trade-off which involves setting the average signal envelope level (or equivalently the power amplifier output signal power level) relative to the power amplifier saturation level in such a way that it maximizes efficiency on the one hand and minimizes intermodulation noise on the other.

The present invention allows one to operate the power amplifier at higher efficiency for a given intermodulation noise level or equivalently, to obtain lower intermodulation noise at a given efficiency. The technique is effective for Raleigh-distributed signals or for any other signal waveform that has a high peak-to-average envelope distribution.

DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1:
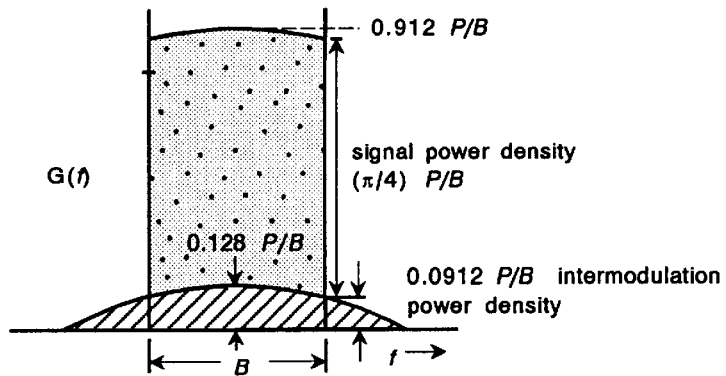
FIG. 1 is the output spectrum of a band-pass limiter with a Gaussian input and corresponds to FIGS. 9–12 of the Spilker reference cited above.
Figure 2:
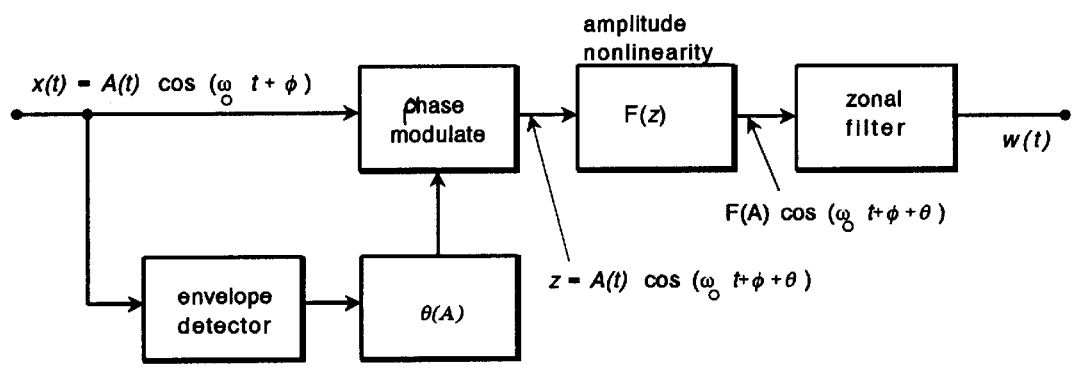
FIG. 2 is a theoretical model of a power amplifier (corresponding to FIGS. 9–30 of the Spilker reference cited above)
Figure 3A:
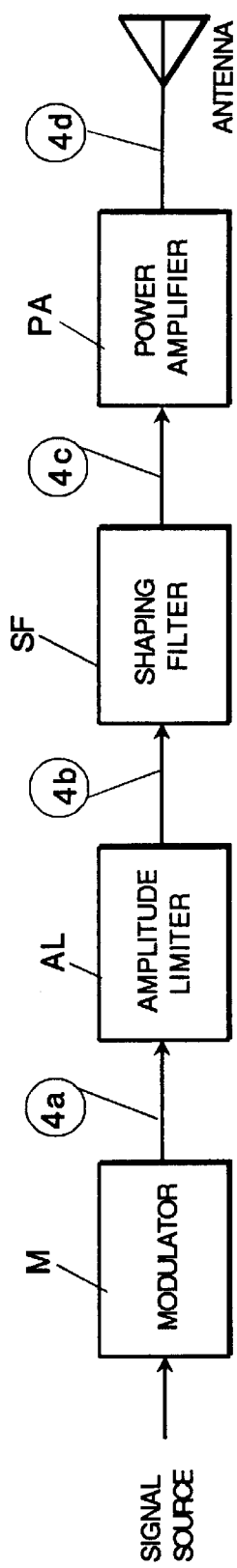
FIG. 3*a* is a block diagram of a circuit for a radio transmitter incorporating the intermodulation noise reduction feature of the invention.

Referring to FIG. 3*a*, intermodulation noise reduction is accomplished according to the invention by passing the signal from the station's modulator M first through an amplitude limiter L and then a shaping filter SF before it enters the radio frequency power amplifier PA. Passing the signal through the limiter generates intermodulation noise with the general spectral characteristics of FIG. 1. However, this is still at low power level. The out-of-band intermodulation noise is then attenuated by the shaping filter SF. The in-band insertion loss of the filter F is not of concern since it occurs at low power level prior to the power amplifier PA.

The shaping filter SF can be a band-stop (notch) filter which, in this case, attenuates the intermodulation noise in the particular radio astronomy band of concern. The shaping filter SF can also be a band-pass filter which attenuates all out-of-band intermodulation noise. This non-linear preprocessing, consisting of a pre-limiter AL and filter SF, causes the signal entering the power amplifier PA to be characterized by:

1) a low peak to average envelope distribution, and 2) low spectral content in the bands to be protected.

The clipping of the signal by the power amplifier PA itself is therefore eliminated or greatly reduced. The other non-linear effects in the power amplifier PA will reintroduce some level of intermodulation noise into the spectrum at the output of the power amplifier PA, however, the overall result can be a dramatic improvement in the intermodulation noise performance of the power amplifier PA.

As shown in FIGS. 5 and 6a–d, one of the advantages of this invention is that a single pre-limiter AL' and filter SF' can be used to drive many paralleled power amplifiers $PA_1$, $PA_2$ ... $PA_N$, such as would be found in a phased array antenna. Individual filtering in each power amplifier PA would be prohibitively expensive.

Typical results are illustrated by FIGS. 4a–d and 6a–d. In both cases the input signal is a band-limited Raleigh-distributed signal with bandwidth from 1618 MHz to 1626 MHz. The radio astronomy band to be protected is from 1610 to 1613 MHz. The output spectrum of the power amplifier with the pre-processing described above is shown in FIG. 4 for a band-stop filter and in FIG. 6 for a band-pass filter. Note that in this case the band-pass filter SF provides superior performance and in fact meets the stated requirement on intermodulation noise suppression for the radio astronomy band as shown in FIGS. 6A–D.

This result was obtained by a computer simulation that uses an analytical model of a non-linear power amplifier that is based on the measured characteristics of actual L-band power amplifiers.

Figure 3B:
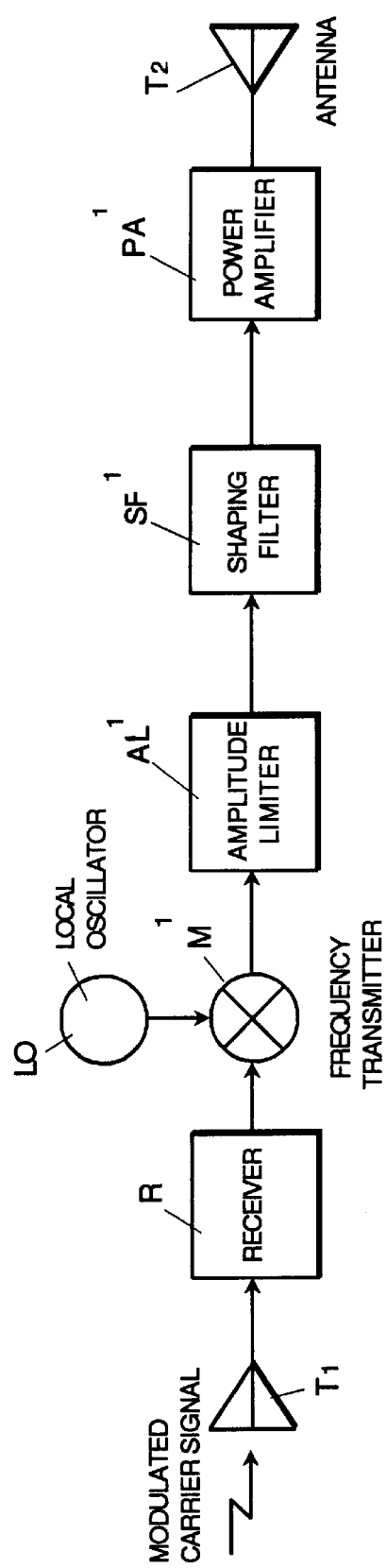
FIG. 3*b* is a block diagram of a circuit for a radio transponder (such as a satellite) incorporating the invention.
Figure 4:
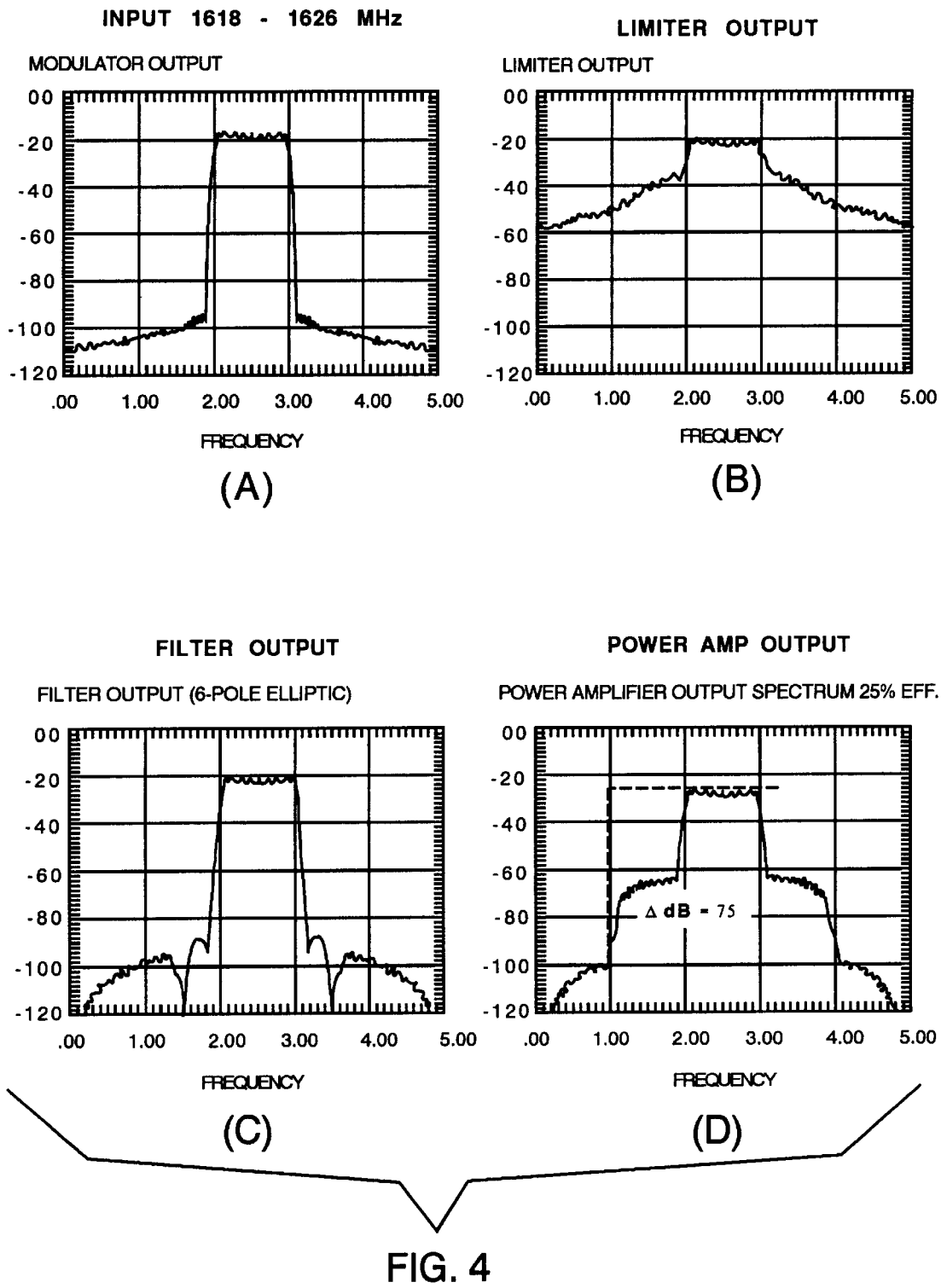
FIGS. 4*a*–4*d* are waveforms of the input from the modulator (1618–1626 MHz), limiter output, shaping filter output and power output spectrums, respectively, of FIG. 3*a*.
Figure 5:
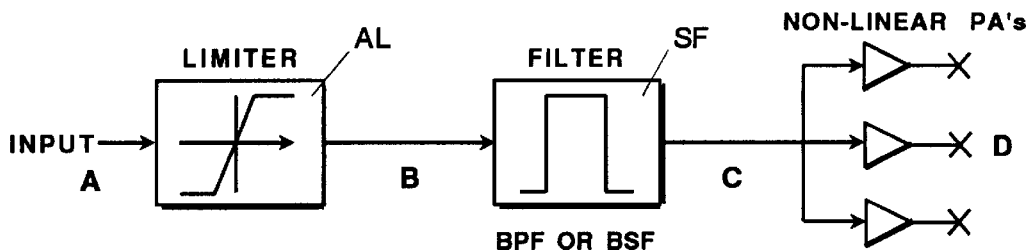
FIG. 5 is a block diagram of a circuit for intermodulation noise reduction incorporating the invention showing an array of parallel power amplifiers for a phased array antenna, and FIGS. 6*a*–6*d* correspond to FIGS. 4*a*–4*d*, for the embodiment shown in FIG. 5 with corresponding points labeled A–D, respectively.
Figure 6:
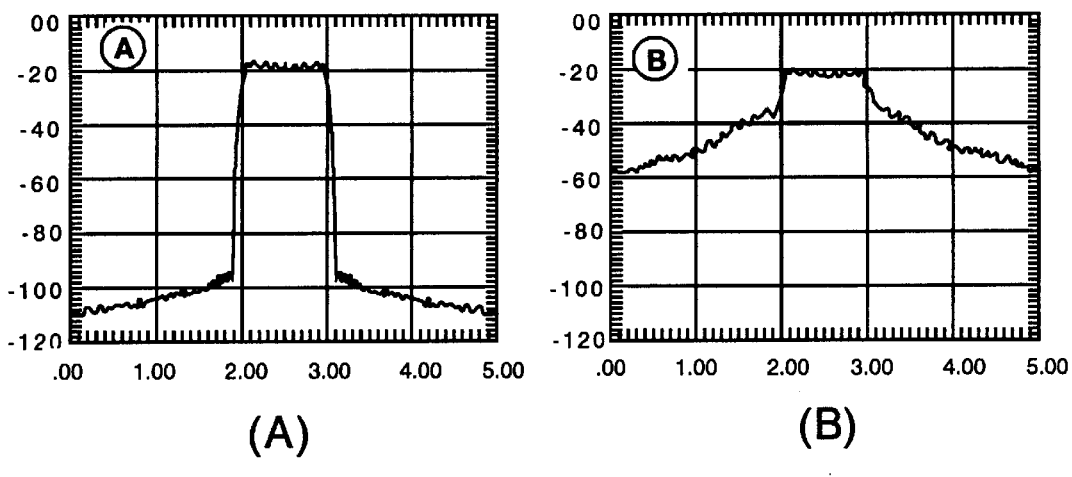
Figure 6:
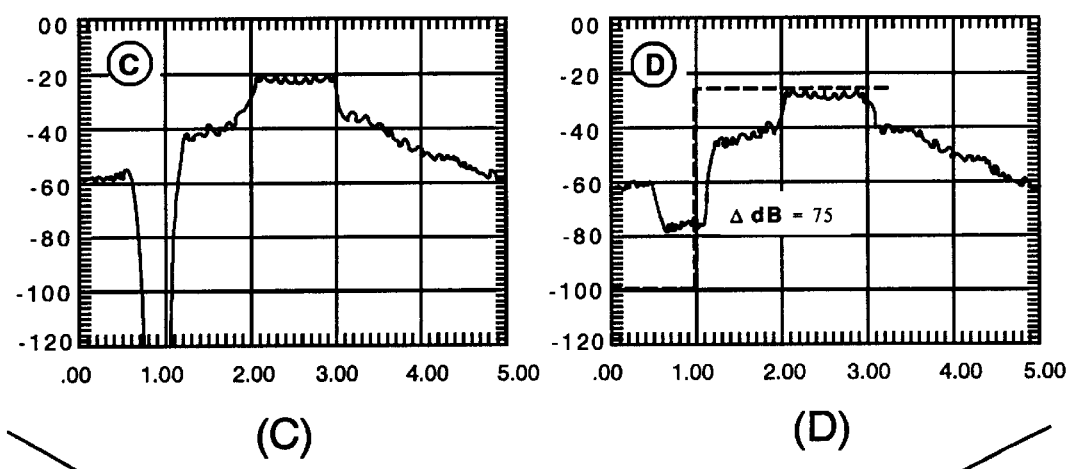

The embodiment shown in FIG. 3b is of a radio transponder of a satellite wherein the modulated carrier signal arrives at transponder antenna $T_1$. This signal is processed by receiver R, frequency translated by mixer M and local oscillator LO to provide a signal to amplitude limiter AL' and shaping filter SF', which have been described in connection with FIG. 3a. The output from shaping filter SF' (see FIG. 4c) is supplied to power amplifier PA' whose output is supplied in turn to antenna $T_2$ on the satellite transponder.

While a preferred embodiment of the invention has been shown and described, it will be obvious that various other embodiments and adaptations of the invention will be apparent to those skilled in the art and it is intended that the appended claims encompass such obvious embodiments.

What is claimed is:

1. A radio transmitter system comprising a modulated signal source, having a high peak-to-average envelope distribution, a power amplifier means for amplifying signals from said source, and an antenna system connected to said power amplifier means and intermodulation noise suppressing means connected between said modulated signal source and said power amplifier, said intermodulation noise suppression means comprising:

an amplitude limiter connected to said signal source to produce a lower peak-to-average envelope distribution and a shaping filter for attenuating intermodulation noise connected between said amplitude limiter and said power amplifier.

2. The invention defined in claim 1 wherein said shaping filter is a band-stop notch filter which attenuates said intermodulation noise in a selected radio band.

3. The invention defined in claim 1 wherein said shaping filter is a bandpass filter which attenuates all out-of-band intermodulation noise.

4. The invention defined in claim 1 wherein said intermodulation noise suppressing means causes the signal entering the power amplifier means to be characterized by (1) a low peak-to-average envelope distribution and (2) low spectral content in the radio frequency bands to be protected.

5. The invention defined in any one of claims 1–4 wherein said power amplifier means is comprised of a plurality of separate power amplifiers connected in parallel and said antenna means includes an antenna element for each power amplifier.

6. The method of reducing intermodulation noise in an RF power amplifier system wherein a modulator supplies modulated signals to said RF power amplifier comprising (1) amplitude limiting said modulated signals to lower the peak-to-average envelope distribution, and (2) passing the amplitude limited signals through a shaping filter to achieve a low spectral content in the RF bands to be protected.

* * * * *